US009163180B2

(12) United States Patent
Marion et al.

(10) Patent No.: US 9,163,180 B2
(45) Date of Patent: Oct. 20, 2015

(54) PROCESS FOR THE CONVERSION OF CARBON-BASED MATERIAL BY A HYBRID ROUTE COMBINING DIRECT LIQUEFACTION AND INDIRECT LIQUEFACTION IN THE PRESENCE OF HYDROGEN RESULTING FROM NON-FOSSIL RESOURCES (71) Applicant: IFP Energies nouvelles, Rueil-Malmaison Cedex (FR)

(72) Inventors: Pierre Marion, Antony (FR); Alain Quignard, Roussillon (FR); Wilfried Weiss, Valencin (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 530 days.

(21) Appl. No.: 13/706,905

(22) Filed: Dec. 6, 2012

(65) Prior Publication Data
US 2013/0149767 A1 Jun. 13, 2013

(30) Foreign Application Priority Data

Dec. 7, 2011 (FR) ...................................... 11 03754
Dec. 7, 2011 (FR) ...................................... 11 03755

(51) Int. Cl.
| C10G 1/06 | (2006.01) |
| C10G 2/00 | (2006.01) |
| C10G 1/00 | (2006.01) |
| C10G 45/64 | (2006.01) |
| C10G 47/16 | (2006.01) |
| C10G 47/20 | (2006.01) |
| C10K 3/02 | (2006.01) |
| C10G 65/14 | (2006.01) |
| C10G 1/08 | (2006.01) |
| C01B 3/36 | (2006.01) |
| C25B 1/04 | (2006.01) |
| C10J 3/00 | (2006.01) |
| C10K 1/00 | (2006.01) |
| C10K 3/06 | (2006.01) |

(52) U.S. Cl.
CPC . *C10G 2/332* (2013.01); *C01B 3/36* (2013.01); *C10G 1/002* (2013.01); *C10G 1/065* (2013.01); *C10G 1/08* (2013.01); *C10G 2/32* (2013.01); *C10G 45/64* (2013.01); *C10G 47/16* (2013.01); *C10G 47/20* (2013.01); *C10G 65/14* (2013.01); *C10J 3/00* (2013.01); *C10K 1/005* (2013.01); *C10K 3/026* (2013.01); *C10K 3/06* (2013.01); *C25B 1/04* (2013.01); *C01B 2203/025* (2013.01); *C01B 2203/0233* (2013.01); *C01B 2203/0415* (2013.01); *C01B 2203/0475* (2013.01); *C01B 2203/062* (2013.01); *C10G 2300/1011* (2013.01); *C10G 2300/1022* (2013.01); *C10G 2300/4043* (2013.01); *C10G 2400/02* (2013.01); *C10G 2400/04* (2013.01); *C10J 2300/093* (2013.01); *C10J 2300/0989* (2013.01); *C10J 2300/1618* (2013.01); *C10J 2300/1659* (2013.01); *C10J 2300/1671* (2013.01); *C10J 2300/1684* (2013.01); *C10J 2300/1846* (2013.01); *Y02E 50/32* (2013.01); *Y02E 60/366* (2013.01)

(58) Field of Classification Search
CPC ...................................................... C10G 1/06
See application file for complete search history.

(56) References Cited

U.S. PATENT DOCUMENTS

| 4,045,329 A | 8/1977 | Johanson et al. |
| 4,569,749 A | 2/1986 | Wright |
| 5,200,063 A | 4/1993 | Neskora et al. |
| 2008/0115415 A1 | 5/2008 | Agrawal et al. |
| 2011/0174683 A1* | 7/2011 | Cui et al. .......................... 208/89 |
| 2011/0230688 A1 | 9/2011 | Charon et al. |
| 2012/0123000 A1 | 5/2012 | Lecompte |

FOREIGN PATENT DOCUMENTS

| WO | WO-2008 033812 | 3/2008 |
| WO | WO-2008 083601 | 7/2008 |
| WO | WO-2010 135381 | 11/2010 |
| WO | WO-2011 004088 | 1/2011 |

OTHER PUBLICATIONS

Blesl, M. et al., "Liquid fuels production from coal and gas," The IEA-ETSAP Organisation, May 31, 2010, XP002676977.
Gray, D. et al., "The hybrid plant concept: Combining direct and indirect coal liquefaction processes," The Fischer Tropsch Organization, Dec. 31, 1991, pp. 299-316, XP002676976.
Krichko, A. A. et al., "Production of engine fuels from coals of the kansk-achinsk basin," Chemistry and Technology of Fuels and Oils, Dec. 31, 1984, vol. 20, No. 3, pp. 113-117, pp. XP002676985.
Leckel, D. et al., "Catalytic hydroprocessing of coal-derived gasification residues to fuel blending stocks: Effect of reaction variables and catalyst on hydrodeoxygenation (HDO), Hydrodenitrogenation (HDN), and Hyrodesulfurization (HDS)," Energy & Fuels, 2006, vol. 20, pp. 1761-1766.
Accelergy Shanghai R & D CT Co, "An integrated coal liquefaction process," Espacenet, Publication Date: Jul. 17, 2008; English Abstract of WO-2008 083601.

* cited by examiner

*Primary Examiner* — Randy Boyer
(74) *Attorney, Agent, or Firm* — Millen, White, Zelano & Branigan, P.C.

(57) ABSTRACT

A process for the conversion of carbon-based material to fuel bases by a hybrid route combining direct ebullent bed liquefaction and indirect liquefaction by gasification followed by a Fischer-Tropsch synthesis, including a stage of production of hydrogen resulting from non-fossil resources and a reverse water gas reaction stage. This process makes it possible to limit emissions of greenhouse gases.

19 Claims, 1 Drawing Sheet

PROCESS FOR THE CONVERSION OF CARBON-BASED MATERIAL BY A HYBRID ROUTE COMBINING DIRECT LIQUEFACTION AND INDIRECT LIQUEFACTION IN THE PRESENCE OF HYDROGEN RESULTING FROM NON-FOSSIL RESOURCES

The present invention relates to a process for the conversion of carbon-based material into fuel bases, in particular into middle distillates, and/or into chemicals. More specifically, it relates to a process for the conversion of carbon-based material via a hybrid route in which direct liquefaction in an ebullated bed is combined with indirect liquefaction by gasification followed by a Fischer-Tropsch synthesis. The process according to the invention includes a stage of production of hydrogen resulting from non-fossil resources and a stage of reverse water gas reaction and makes it possible to limit the emissions of greenhouse gases.

The transportation sector consumes a great deal of energy and today depends essentially on the non-renewable oil resource. At the environmental level, the combustion of fuels makes a major contribution to the emissions of greenhouse gases (GHG), in particular $CO_2$. In the context of climate change and dependence on oil, it is therefore necessary to diversify fuels. There are potentially a great many alternatives to the use of oil: natural gas, coal, biomass, water power, wind power, solar energy, marine energy or nuclear energy.

In view of abundant coal reserves, an attractive alternative is coal liquefaction. Coal liquefaction, better known under the term "Coal-To-Liquids" or "CTL", consists of the conversion of coal to liquid hydrocarbons, such as fuels or petrochemical products. Coal liquefaction is based on two different conceptual routes:

The "indirect" route consists, in a first step, in gasifying coal to give a gas composed of carbon monoxide and hydrogen, known as synthesis gas. This gas is subsequently converted to liquid hydrocarbons by the Fischer-Tropsch process. The indirect route is also known under the term "Indirect Coal Liquefaction" or "ICL".

The "direct" route consists in reacting coal in a solvent in the presence of hydrogen at high temperatures and pressures in order to produce liquid hydrocarbons. The direct route is also known under the term "Direct Coal Liquefaction" or "DCL".

Recently, a new concept has been developed in which the direct route and the indirect route are combined. This "hybrid" route combines the two routes by converting a portion of the coal via the direct route and another portion via the indirect route.

The products obtained via the indirect or direct route exhibit chemical structures which are very different but which are also very often complementary:

The direct route produces, before final refining, fuel bases of naphthenic/aromatic nature of high density and relatively low cetane number (diesel fraction) or smoke point (kerosene) but with excellent cold properties.

The indirect route produces, before final refining, fractions of paraffinic nature, that is to say with a low density and exhibiting a cetane index or a smoke point which are far greater than the specification, thus with excellent combustion properties, but with very poor cold properties.

As the products obtained by the two routes complement one another, the hybrid route proves to be particularly advantageous in producing fuel bases meeting or being very close to the specifications in force.

It is important to emphasize that coal liquefaction, whether direct, indirect or via the hybrid route, is above all a problem of hydrogen content. The composition of coal, which is poor in hydrogen (H/C ratio approximately of 0.6-0.8), does not make it possible to obtain fuel bases (H/C ratio approximately of 2) without a massive contribution of hydrogen. The hydrogen necessary for the coal conversion reaction (direct route) and for the refining of the liquefaction products is generally supplied from natural gas by steam reforming or also, if the only source of primary energy available is coal (which is generally the case for a plant installed in the immediate proximity of the mine), by coal gasification. Coal gasification nevertheless produces, in addition to the desired hydrogen, very large amounts of $CO_2$, which presents an extra emission of greenhouse gases which is difficult to accept in the international context of reducing this gas, unless it is captured and sequestered, which represents a significant additional cost.

Thus, the coal liquefaction industry will only be able to experience significant industrial growth under eco-friendly conditions on the express condition of either incorporating the capture and the storage of the $CO_2$ or of using, at least in part, hydrogen produced from sources not emitting greenhouse gases, or also combining these two routes. With regard to the $CO_2$ balance, the use of hydrogen produced by resources not emitting GHGs is to be favoured.

Application US2009/0286889 describes a process for coal conversion by the hybrid route in which a fraction of the coal is converted by the direct route and another fraction is gasified in parallel with a biomass gasification in order to produce synthesis gas, which is subsequently converted by Fischer-Tropsch synthesis. This process is targeted at reducing the $CO_2$ emissions by using the $CO_2$ produced in the process to produce algae and/or chemicals.

Although the process according to the invention has been developed for coal liquefaction, it can also be applied to the liquefaction of any carbon-based material.

The object of the present invention is to provide a process for the liquefaction of carbon-based material by the hybrid route which limits the emissions of GHGs and in particular $CO_2$ while improving the conversion of the carbon-based material to give purified liquid hydrocarbon bases.

In its broadest form, the present invention is defined as a process for the conversion of carbon-based material into fuel bases, comprising the following stages:

a) liquefaction of at least a portion of the said carbon-based material in the presence of hydrogen in at least one reactor comprising a supported catalyst as an ebullated bed, b) separation of the effluent obtained on conclusion of stage a) into at least one light fraction of fuel base hydrocarbons and a residual fraction comprising compounds boiling at at least 340° C., c) production of hydrogen using at least one non-fossil resource, the hydrogen thus produced being at least in part introduced into the liquefaction stage a), and the subsequent reverse water gas reaction stage e) and subsequent Fischer-Tropsch reaction stage f), d) gasification of a portion of the carbon-based material and/or of a portion at least of the residual fraction resulting from stage b) in order to produce synthesis gas, comprising hydrogen, CO and $CO_2$, and a residual fraction from the gasification, e) separation of a portion at least of the $CO_2$ present in the synthesis gas and conversion of the separated $CO_2$ by a reverse water gas reaction in the presence of hydrogen resulting from stage c), to produce CO and water, f) conversion of the synthesis gas, supplemented with at least a portion of the CO resulting from stage e) and at least a portion of hydrogen resulting from stage c), by Fischer-Tropsch synthesis to give fuel bases.

The research studies carried out by the Applicant on the conversion of carbon-based material by the hybrid route led it to discover that this process, including a stage of production of hydrogen resulting from non-fossil resources and a reverse water gas reaction stage in the indirect route, makes it possible to incorporate more carbon present in the carbon-based material in the fuel bases and thus to considerably lower the $CO_2$ emissions in comparison with conventional liquefaction processes, while improving the conversion of the feedstock to give liquid hydrocarbons of economic value.

This is because the hydrogen necessary for the direct liquefaction originates from a stage of production of hydrogen resulting from non-fossil resources and thus avoids, at least in part, the conventional gasification producing, in addition to the desired hydrogen, not insignificant amounts of $CO_2$ or also the use of natural gas to produce hydrogen by steam reforming, which is itself also a serious emitter of $CO_2$.

The hydrogen produced by gasification of a portion of the feedstock and/or of the residual fraction resulting from the direct liquefaction can thus be sent, preferably all of it, to the Fischer-Tropsch synthesis. This is because, in order to produce the maximum amount of paraffins in the Fischer-Tropsch reactor, this reactor requires a synthesis gas having an $H_2/CO$ molar ratio which is close to 2 (and thus a hydrogen surplus). When this $H_2/CO$ ratio is too low, which is typically the case when solid or liquid carbon-based material, in particular coal, is gasified, it is known in the prior art to be able to increase it by partial conversion of CO to $H_2$, according to the "water gas" reaction, also known as water gas shift or WGS or shift reaction, which operates according to the balanced reaction: $CO+H_2O \rightarrow CO_2+H_2$. This reaction, although beneficial for the production of hydrogen, thus at the same time produces undesirable $CO_2$. Likewise, the conversion of CO to $CO_2$ by the WGS reaction reduces the amount of CO which can be converted to hydrocarbons by the Fischer-Tropsch synthesis, in particular to liquid hydrocarbons. In point of fact, one objective of the present invention is to maximize the production of liquid products from a given feedstock. The contribution of hydrogen resulting from non-fossil resources thus makes it possible to supplement the need for hydrogen in the Fischer-Tropsch synthesis (good $H_2/CO$ ratio) and to eliminate the $CO_2$-producing water gas reaction.

The synthesis gas is generally a gas mixture comprising CO, hydrogen, water vapour and $CO_2$. According to the process of the invention, the $CO_2$ present in the synthesis gas is made economic use of by a "reverse water gas" reaction, also known as reverse water gas shift or RWGS or reverse shift, which operates according to the balanced reaction: $CO_2+H_2 \rightarrow CO+H_2O$. This reaction is the reverse reaction of the abovementioned "WGS" reaction and is promoted by high temperatures. It thus makes it possible to remove an undesirable product ($CO_2$) and to convert it into a starting material (CO) for the Fischer-Tropsch synthesis and thus to optimize the carbon yield. The CO thus produced is subsequently converted, with hydrogen resulting from non-fossil resources, in the Fischer-Tropsch reaction.

Another advantage of the present invention is the fact of being able to supply the hydrogen production stage with non-fossil energy sources which do not emit $CO_2$ or which are neutral with regard to $CO_2$ emissions, such as nuclear energy and/or renewable energy sources. Thus, the reduction in the emissions can take place at two levels: the non-fossil hydrogen source and the non-fossil energy necessary for the production of hydrogen from this source.

If necessary, the hydrogen resulting from non-fossil resources necessary for the direct liquefaction can be supplemented by hydrogen originating from the stage of gasification of a portion of the carbon-based material and/or of the residual fraction from the direct liquefaction or by hydrogen originating from any other hydrogen production process, such as, for example, by steam reforming of natural gas.

According to an alternative form, the hydrogen resulting from non-fossil resources is supplemented by hydrogen originating from a stage of steam reforming the light fractions and/or the light naphtha which are produced by the process.

The present invention also includes the possibility of incorporating processes for capturing and storing $CO_2$ from the emissions emitted in the process during the production of services, such as heat, steam and/or electricity, and/or during the production of hydrogen.

In the case of gasification of biomass for the production of hydrogen resulting from non-fossil resources, the $CO_2$ given off during the gasification is compensated for by the $CO_2$ which was absorbed during photosynthesis during the growth of the plants used. In this case, the $CO_2$ balance is neutral. Furthermore, this $CO_2$ given off can be captured and stored. In this case, the $CO_2$ balance is negative.

Likewise, the oxygen necessary for the gasification preferably originates from the electrolysis of water used for the production of hydrogen from non-fossil resources.

The hybrid route makes it possible, by virtue of the complementary nature of the two routes, to obtain an optimum quality of the products, in particular of the middle distillates, but also of the petrol fraction. Thus, the hybrid route makes it possible to produce fuel bases having diversified chemical structures making it possible to best observe the specifications in force. The subsequent treatments can then be carried out under milder operating conditions, which exhibits a decrease in the emissions of greenhouse gases and a saving in operating costs. Likewise, these subsequent treatments can be carried out jointly for the products from the two routes.

The process according to the invention thus makes possible an improvement in the conversion of the carbon-based material into liquid bases and thus a limitation on the emissions of GHGs by virtue of a better incorporation of the carbon resulting from carbon-based material in the products of economic value, in comparison with a process for direct liquefaction, indirect liquefaction or liquefaction via the hybrid route where the hydrogen originates from fossil resources. These improvements are due in particular to the incorporation of the stage of production of hydrogen resulting from non-fossil resources and of the reverse water gas reaction stage.

DETAILED DESCRIPTION

Hydrogen Resulting from Non-Fossil Resources

The process according to the invention comprises a hydrogen production stage; the hydrogen thus produced will be sent to the liquefaction stage, to the reverse water gas reaction stage, to the Fischer-Tropsch synthesis stage or else to a final refining stage.

The hydrogen necessary for the reaction results from non-fossil resources, such as water, hydrochloric acid, hydrogen chloride HCl, hydrogen sulphide $H_2S$ and/or biomass.

The stage of production of hydrogen resulting from water comprises electrolytic, chemical and/or biological processes, such as the decomposition of water by electrolysis, by high-temperature electrolysis, by thermochemical cycles and/or by microorganisms.

The decomposition of water can be carried out in particular by:
conventional electrolysis according to the general formula:

$$\text{electricity} + H_2O(\text{liquid}) \rightarrow H_2 + O_2$$

Electrolysis is the process for chemical decomposition of water to give oxygen and hydrogen under the action of an electric current. Industrial electrolysis is generally carried out using an aqueous potassium hydroxide solution, the concentration of which varies as a function of the temperature (typically from 25% by weight at 80° C. up to 40% at 160° C.). Potassium hydroxide is preferred to sodium hydroxide, essentially for reasons of superior conductivity at an equivalent temperature level and of better control of the chloride and sulphate impurities.

electrolysis at high temperature (700 to 900° C.) and at reduced pressure according to the general formula:

$$\text{electricity} + H_2O(\text{steam}) \rightarrow H_2 + O_2$$

High-temperature electrolysis is more efficient than the process at ambient temperature since a portion of the energy necessary for the reaction is contributed via the heat, which is cheaper to obtain than electricity, and electrolysis reactions have a better yield at high temperature.

thermochemical cycles according to the general formula:

$$\text{heat} + H_2O \rightarrow [\text{cyclic chemical reactions}] \rightarrow H_2 + O_2$$

Thermochemical cycles generally operate at temperatures between 800 and 1000° C. and use water as the starting material. They comprise the formation of hydrogen in one of their stages. The principle of these methods is to extract the hydrogen formed and to recycle the intermediate chemical reactants.

Mention may be made, as thermochemical cycles, of the calcium/bromide process (decomposition of hydrobromic acid to give hydrogen over an iron catalyst) or the sulphuric acid process via the electrolysis of sulphur dioxide according to $SO_2 + 2H_2O \rightarrow H_2SO_4 + H_2$, followed by the decomposition of the sulphuric acid according to the scheme: $H_2SO_4 \rightarrow SO_2 + H_2O + \frac{1}{2}O_2$. Another thermochemical cycle is the iodine/sulphur process: the formation of sulphuric acid according to the scheme: $I_2 + SO_2 + 2H_2O \rightarrow 2HI + H_2SO_4$, followed by the dissociation of the hydriodic acid according to $2HI \rightarrow I_2 + H_2$ and the dissociation of the sulphuric acid according to $H_2SO_4 \rightarrow SO_2 + H_2O + \frac{1}{2}O_2$, the latter reaction being endothermic and requiring a temperature of at least 850° C. An alternative form for the dissociation of the sulphuric acid is the Bunsen reaction, $H_2SO_4 + 2HI \rightarrow I_2 + SO_2 + 2H_2O$, which exhibits the advantage of taking place at a temperature of the order of 120° C.

photosynthetic microorganisms, such as, for example, certain green algae (for example *Chlamydomonas reinhardtii*) and certain cyanobacteria, which, under the effect of light and in the absence of oxygen, produce hydrogen in bioreactors.

by thermolysis of water.

The stage of production of hydrogen resulting from hydrochloric acid or hydrogen chloride comprises electrolytic and/or chemical processes. Thus, the hydrogen can be produced via an electrolysis of hydrochloric acid using CuCl or also hexachloroiridate complexes $IrCl_6^{3-}$ and $IrCl_6^{2-}$. Mention may be made, as chemical process, of the reaction of hydrogen chloride with cerium dioxide at temperatures above 775° C., thus producing chlorine and hydrogen.

The stage of production of hydrogen resulting from hydrogen sulphide comprises thermal and/or chemical processes. Thus, hydrogen sulphide can be decomposed thermally (1500° C.) in a direct fashion according to the reaction $H_2S \rightarrow H_2 + S$. Mention may be made, as chemical process, of the "Hysulf™" process, developed by Marathon Oil Company, which is based on an oxidation/reduction cycle using anthraquinone derivatives. Another chemical process, developed by the Applicant Company (WO2009/090316), is based on the reaction of metal oxides with hydrogen sulphide, producing metal sulphides, water and hydrogen.

The stage of production of hydrogen according to the present process can also be carried out by biomass gasification. By this process, synthesis gas is first produced and then the content of hydrogen is increased by virtue of the WGS reaction. The advantage of resorting to biomass is that the $CO_2$ given off by the water gas conversion is compensated for by the $CO_2$ which was absorbed during photosynthesis during the growth of the plants used. Furthermore, the $CO_2$ given off during the gasification is preferably captured by an absorption process. These processes are known to a person skilled in the art; mention may be made of the processes of absorption by amines or by potassium carbonate. The gasification of biomass thus exhibits a neutral balance, indeed even a negative balance (if the $CO_2$ is captured), in terms of greenhouse gases. Likewise, the energy expenditure necessary for the production of services can be achieved using biomass as fuel.

According to another aspect of the present invention, the energy necessary for the production of hydrogen according to the abovementioned processes is preferably non-fossil energy which does not emit $CO_2$ or which is neutral in $CO_2$ emissions. One source of non-fossil energy is nuclear energy from nuclear power stations, which produces heat which can be used directly (for the thermochemical cycles) or can be converted into electricity (for the electrolysis). Other energy sources free of GHG emissions or neutral with regard to GHGs are renewable energies, such as photovoltaic solar energy, low-temperature solar thermal energy (production of hot water), high-temperature solar thermal energy (production of electricity), wind energy, water power or hydroelectricity, marine energy sources, geothermal energy and/or biomass. These non-fossil energy sources can be used alone or as a combination of two or more of them in equal or different proportions.

According to the present invention, the non-fossil resource is preferably water, the hydrogen preferably being produced by conventional electrolysis; the energy for this electrolysis is preferably provided by renewable energy sources, preferably by solar energy, geothermal energy and/or biomass. This is because these energy sources are distinguished in that they are virtually inexhaustible, are easy to access and do not produce or produce relatively little problematic waste.

According to another aspect of the present invention, processes for capturing and storing $CO_2$ from the emissions originating from the process can be incorporated in order to further reduce the emissions of GHGs. Generally, these emissions are emitted during the production of services, such as heat, steam and/or electricity. The $CO_2$ present in the emissions is preferably captured by an absorption process known to a person skilled in the art.

If necessary, the hydrogen resulting from non-fossil resources necessary for the direct liquefaction can be supplemented by hydrogen originating from the stage of gasification of a portion of the carbon-based material and/or of the residual fraction from the direct liquefaction and/or from any other process which produces hydrogen: steam reforming of natural gas or light hydrocarbon fractions, preferably resulting from the liquefaction process. The synthesis gas thus produced can be sent to a unit for the purification of hydrogen, which is typically an adsorption unit with regeneration by variation in pressure of the adsorbent (also known as "pressure swing adsorption" or "PSA") or a hydrogen membrane. A portion of the hydrogen present in the synthesis gas from stage d) can be separated and sent to the liquefaction stage a).

The oxygen necessary for the gasification can be oxygen originating from an air separation unit and/or, preferably, from the electrolysis of the water used in the production of hydrogen resulting from non-fossil resources. The use of the oxygen produced during the electrolysis makes it possible to economize on the air separation unit conventionally used to supply the gasification reactor with oxidant.

The Feedstock

The carbon-based material used in the process can be coal, biomass, algae, feedstocks resulting from oil and/or from the refining of oil, products resulting from the thermochemical or hydrothermal conversion of these feedstocks, hydrocarbon waste, industrial polymers, organic waste and/or household plastics. These feedstocks can be used alone or as a mixture of two or more of them in equal or different proportions.

In the case of coal, the feedstock used is preferably of the bituminous or sub-bituminous type. However, lignites can also be used.

In the case of biomass, the feedstock used is a feedstock resulting from renewable sources, such as, for example, oils and fats of vegetable or animal origin (crude or refined), lignocellulose biomass (such as wood, plant waste, paper or by-products from the paper industry, such as Kraft lignin, or black liquors resulting from the manufacture of paper pulp) or one or more constituents of lignocellulose biomass chosen from the group formed by cellulose, hemicellulose and lignin, algae (micro- and macroalgae), all products or a mixture of products resulting from the thermochemical conversion of biomass or algae (charcoal, the oil from the pyrolysis of lignocellulose biomass or algae, pyrolytic lignin), products from the hydrothermal conversion of lignocellulose biomass or algae, or activated sludges resulting from water treatment plants.

In the case of oil, the hydrocarbon feedstocks concerned are feedstocks such as oil bottoms, vacuum distillates of oil origin, crude oils, synthetic crudes, topped crude oils, deasphalted oils, deasphalting resins, asphalts or deasphalting tars, derivatives from oil conversion processes (such as, for example: the light gas oil from catalytic cracking (also known as "light cycle oil" or "LCO"), the heavy gas oil from catalytic cracking (also known as "heavy cycle oil" or "HCO"), the residue from fluid catalytic cracking, the heavy gas oil or the vacuum gas oil from coking, the residue from visbreaking or a similar thermal process, such as petroleum coke, and the like), aromatic extracts resulting from lines for the production of bases for lubricants, bituminous sands or their derivatives, oil shales or their derivatives, or mixtures of such feedstocks. More generally, feedstocks comprising at least 50% by weight of product distilling above 250° C. and at least 25% by weight distilling above 350° C. will be combined under the term "oil hydrocarbon feedstocks".

Other feedstocks concerned are feedstocks such as hydrocarbon waste and/or industrial polymers, such as, for example, the recycled polymers from waste tyres, polymer wastes originating, for example, from recycled motor vehicles, or household organic or plastic waste.

The feedstocks comprising at least a portion of the effluents resulting from the Fischer-Tropsch synthesis, carried out via the gasification of feedstocks of oil type, non-oil type (coal, gas) or renewable type (biomass, algae), can also act as feedstock. The tar oils and wastes resulting from the said gasification can also be used as feedstock.

Pretreatment

The carbon-based material can be introduced in the liquid or solid form into the direct liquefaction unit or into the gasification.

Before it is converted by the two liquefaction routes, the carbon-based material can be subjected to one or more pretreatment stages. These stages can be identical or different for the direct liquefaction and the gasification. For reasons of plant economy, they are preferably identical and are carried out in a common chamber. These stages are optional and can be carried out in any order with respect to one another.

The solid carbon-based material is preferably subjected to a pretreatment which reduces its water content (drying), followed by a stage in which the size of the particles is reduced (milling). The drying stage is carried out at a temperature of less than 250° C., preferably of less than 200° C., preferably for from 15 to 200 minutes. The dried carbon-based material is subsequently sent to a mill which makes it possible to achieve the desired particle size.

Pretreatments specific to the feedstock can be added and can be carried out in an order irrespective of the optional drying and milling pretreatment stages.

In the case of the direct route, the coal is preferably subjected to a pretreatment which reduces its ash content; these technologies (washing operations, extraction operations, and the like) are widely described in the literature.

In the case of the lignocellulose biomass, a roasting pretreatment can be added to or replace the drying stage. The roasting is defined as a pyrolysis at moderate temperature (between 200° C. and 300° C. in the absence of air) and with a controlled residence time (generally for 15 to 120 minutes) as it is accompanied not only by drying but also by partial destruction of the lignocellulose material.

The algae are preferably subjected, prior to the optional drying and milling stages, to a demineralization stage known to a person skilled in the art in order to reduce the inorganic salts and metals harmful to the liquefaction catalysts.

After the pretreatment, particles of carbon-based material having a moisture content of 1 to 50%, preferably of 1 to 35% and more preferably of 1 to 10%, and a particle size of less than 600 μm, preferably of less than 150 μm, are obtained.

Direct Route: Direct Liquefaction in an Ebullated Bed (Stage a)

A portion at least of the carbon-based material is sent to a direct liquefaction unit.

In the case of the introduction of the carbon-based material in the liquid form (for example feedstocks resulting from oil), it can be introduced without pretreatment and/or without suspending.

In the case of the introduction of the carbon-based material in the solid form (for example coal, biomass, and the like), it is advisable to prepare, before it is introduced, a suspension of particles of carbon-based material in a solvent. This carbon-based material/solvent mixture is a suspension of particles of carbon-based material dispersed in the said solvent. In order to form the suspension, the size of the particles of carbon-based material is less than 5 mm, preferably less than 1 mm, preferably less than 650 μm and more preferably less than 150 μm. The solvent/carbon-based material ratio by weight is generally from 0.1 to 3, preferably from 0.5 to 2.

The solvent has a threefold role: suspending of the feedstock upstream of the reaction region, thus making it possible to transport it to the latter, then partial dissolution of the primary conversion products and transfer of hydrogen towards these primary products in order to make possible conversion to liquid while minimizing the amount of solid and gas formed in the said reaction region. This transfer of hydrogen thus presents an additional source of hydrogen for the indispensable need for hydrogen in the conversion of coal to fuels.

The solvent can be any type of liquid hydrocarbon known in the art for the preparation of a suspension. The solvent is preferably a hydrogen-donating solvent comprising, for example, tetralin and/or naphthenic/aromatic molecules. In the case of a cotreatment with other feedstocks, the solvent can also be partially or completely composed of a liquid cofeedstock, such as, for example, the hydrothermal conversion or pyrolysis oils resulting from a carbon-based material (biomass, coal, oil).

According to a preferred alternative form, the solvent originates from a fraction recycled from the process. This fraction preferably comprises the vacuum distillate fraction and more preferably still vacuum gas oil, resulting from the separation after direct liquefaction. It is also possible to recycle a portion of the atmospheric distillates, such as diesel, alone or as a mixture with the vacuum distillate fraction. Generally, the fraction or fractions resulting from the separation stages b) and having a distillation range in the interval from 180° C. to 550° C., preferably from 200° C. to 550° C., is/are recycled, in part or completely, as solvent to the liquefaction stage a).

In the present invention, the direct liquefaction stage is carried out in at least one reactor, preferably in at least two reactors arranged in series, comprising a supported catalyst in an ebullated bed operating with an ascending stream of liquid and gas.

The hydrogen contribution necessary for the operation is provided by the back-up hydrogen produced in the stage of production of hydrogen resulting from non-fossil resources, optionally supplemented by the hydrogen recycled from the process and/or from another neighbouring refining process. If need be, the back-up hydrogen can also be supplemented by hydrogen resulting from the gasification of the indirect route and/or by the steam reforming of the light fractions resulting from the process.

As the ebullated bed technology is widely known, only the main operating conditions will be taken up here. Ebullated bed technologies use supported catalysts in the form of extrudates, the diameter of which is generally in the order of 1 mm or less than 1 mm. The catalysts remain inside the reactors and are not discharged with the products. The temperature levels are high in order to obtain high conversions while minimizing the amounts of catalysts employed. The catalytic activity can be kept constant by virtue of the in-line replacement of the catalyst. Furthermore, the fact of operating under unvarying operating conditions makes it possible to obtain unvarying yields and product qualities along the cycle. Consequently, owing to the fact that the catalyst is kept agitated by significant recycling of liquid, the pressure drop over the reactor remains low and unvarying.

The fact of preferably using at least two ebullated bed reactors makes it possible to obtain products of better quality and with a better yield, thus limiting the energy and hydrogen requirements in possible post-treatments (hydrotreating, hydrocracking, and the like). In addition, the liquefaction in two reactors makes it possible to have an improved operability with regard to the flexibility of the operating conditions and catalytic system. The operation is usually carried out under a pressure of 15 to 25 MPa, preferably of 16 to 20 MPa, at a temperature of approximately 300° C. to 440° C., preferably between 325° C. and 420° C., for the first reactor and between 350° C. and 470° C., preferably between 350° C. and 450° C., for the second. The hourly velocity by weight is between 0.1 and 5 $h^{-1}$ and the amount of hydrogen mixed with the feedstock is usually from approximately 0.1 to 5 standard cubic meters ($Sm^3$) per kg of feedstock, preferably from approximately 0.1 to 3 $Sm^3$/kg and generally from approximately 0.1 to approximately 2 $Sm^3$/kg in each reactor. After the first stage, the conversion of the feedstock is between 30 and 100%, preferably between 50 and 99%, it being possible for the conversion to be defined with respect to the insolubles in THF, for example. The conversion of the feedstock on a dry base is then everything which is not insoluble in THF.

In the case of just one ebullated bed reactor, the operation is carried out at a temperature of approximately 300° C. to 470° C., preferably 325° C. to 450° C., the other operating conditions being identical to those described above.

The suspension is introduced into the first reactor in the presence of a supported hydroconversion catalyst as an ebullated bed and of hydrogen at least partly resulting from a non-fossil resource. The temperature of the reactor in this first liquefaction stage is preferably lower than that of the second liquefaction stage. At least a portion of the effluent resulting from the first liquefaction stage is subsequently injected into a second liquefaction reactor comprising a supported hydroconversion catalyst as an ebullated bed operating with an ascending stream of liquid and gas. The effluent is mixed with additional hydrogen resulting from a non-fossil resource. This reactor, which operates similarly to the reactor of the first liquefaction stage, is preferably used at a temperature at least approximately 10° C. higher than that of the reactor of the first stage. The pressure of the reactor in this second direct liquefaction stage is from 0.1 to 1 MPa lower than for the reactor of the first stage in order to make possible the flow of at least a portion of the effluent resulting from the first stage without a pump being necessary.

Optionally, the effluent obtained on conclusion of the first liquefaction stage is subjected to a separation of the light fraction and at least a portion, preferably all, of the residual effluent is treated in the second liquefaction stage. This separation is advantageously carried out in an interstage separator described in U.S. Pat. No. 6,270,654 and makes it possible in particular to avoid the excess cracking of the light fraction in the second liquefaction reactor.

It is also possible to transfer all or part of the spent catalyst withdrawn from the reactor of the first liquefaction stage, operating at a lower temperature, directly to the reactor of the second stage, operating at a higher temperature, or to transfer all or part of the spent catalyst withdrawn from the reactor of the second stage directly to the reactor of the first stage. This cascade system is described in U.S. Pat. No. 4,816,841.

The catalysts used during the liquefaction are widely available commercially. The catalyst is generally in the form of extrudates or beads. Typically, they comprise at least one hydro-dehydrogenating element deposited on an amorphous support. Generally, the supported catalyst comprises a metal from Group VIII chosen from the group formed by Ni, Pd, Pt, Co, Rh and Ru, optionally a metal from Group VIb chosen from the group Mo and W, on an amorphous inorganic support chosen from the group formed by alumina, silica, silicas/aluminas, magnesia, clays and the mixtures of at least two of these inorganic compounds. The total content of oxides of elements from Groups VIII and VIb is often 5-40% by weight and in general 7-30% by weight. Generally, the ratio by weight, expressed as oxide(s) from Group VIb to oxide(s) from Group VIII, is 1-20 and generally 2-10. Use may be made, for example, of a catalyst comprising from 0.5 to 10% by weight of nickel, preferably from 1 to 5% by weight of nickel, (expressed as nickel oxide NiO) and from 1 to 30% by weight of molybdenum, preferably from 5 to 20% by weight of molybdenum, (expressed as molybdenum oxide $MoO_3$) on a support. This catalyst can also comprise phosphorus (generally less than 20% by weight and most often less than 10% by weight, expressed as phosphorus oxide $P_2O_5$).

Prior to the injection of the feedstock, the catalysts used in the process according to the present invention are preferably subjected to a sulphurization treatment (in situ or ex situ) which makes it possible to convert, at least in part, the metal entities into sulphide before they are brought into contact with the feedstock to be treated.

The catalysts of the direct liquefaction stages of the present invention can be identical or different in the reactors. Preferably, the catalysts used are based on CoMo or NiMo on alumina.

Separation of the Effluent from the Direct Liquefaction (Stage b)

With the aim of producing fuel bases, the effluent obtained on conclusion of the direct liquefaction is subjected to a separation stage which makes it possible to separate at least a light fraction of hydrocarbons of fuel bases and a residual fraction comprising compounds boiling at at least 340° C. Preferably, the separation stage b) makes it possible to obtain a gas phase, at least one light fraction of hydrocarbons of naphtha, kerosene and/or diesel type and at least one residual fraction comprising compounds boiling at at least 340° C. comprising a vacuum distillate fraction and a vacuum residue fraction.

The separation stage can advantageously be carried out with methods well known to a person skilled in the art, such as distillation, including flash distillation, stripping, liquid/liquid extraction, and the like.

Preferably, the separation is carried out in a fractionation section which can first comprise a high pressure high temperature (HPHT) separator and optionally a high pressure low temperature (HPLT) separator and/or atmospheric distillation and/or vacuum distillation.

The gas phase is preferably subjected to a purification treatment in order to recover the hydrogen and to recycle it to the direct liquefaction reactors. It is the same for the gaseous effluents resulting from the possible subsequent treatment units, such as, for example, the hydrotreating and/or hydrocracking of hydrocarbon fractions. It is also possible to add the gas phase originating from the interstage separator. All these gas phases can also optionally act as steam reforming feedstock to produce hydrogen.

The recovery of the various fuel base fractions (naphtha, kerosene and/or diesel) is not the subject-matter of the present invention and these methods are well known to a person skilled in the art. The products obtained can be used directly as fuel bases (also known as fuel "pools") or can be subjected to additional refining stages including a hydrotreating and/or hydrocracking under high hydrogen pressure. The naphtha, kerosene, gas oil and vacuum gas oil fraction(s) can be subjected to one or more treatments (hydrotreating, hydrocracking, alkylation, isomerization, catalytic reforming, catalytic or thermal cracking or others, according to the fractions under consideration) in order to bring them to the required specifications (sulphur content, smoke point, octane number, cetane number, and the like), separately or as a mixture.

Preferably, at least a portion of the vacuum distillate fraction is recycled, in part or completely, in the liquefaction stage a). The recycling of this phase makes possible an increase in the yield of fuel bases as the portion of the vacuum gas oil fraction recycled represents starting material for the hydrocracking reactions in the two liquefaction reactors. The recycling of this phase, acting as hydrogen-donating solvent, also makes it possible to provide a portion of the hydrogen necessary for the liquefaction. This fraction can also act as base for heavy fuel oils or bunker fuel oils or can be sent to refining units, such as hydrocracking or catalytic cracking units.

For the vacuum residue comprising unconverted feedstock, solids produced by undesirable reactions, such as coke, and inorganic solids present as impurities or originating from fines produced by attrition of the catalyst, the cut point is generally chosen so that the initial boiling point of the heavy fraction is from approximately 450° C. to approximately 550° C. Preferably, at least a portion of the vacuum residue fraction is sent to the gasification stage d).

According to a first embodiment, the effluent resulting from the direct liquefaction is subjected to a stage of separation with decompression, that is to say with decompression between the liquefaction and the subsequent refining stages. The fraction(s) which will be treated in the subsequent refining stages are thus sent after decompression to the said stages. This configuration can be described as a non-integrated scheme.

According to a second embodiment, the effluent resulting from the direct liquefaction is subjected to a stage of separation without decompression, that is to say without decompression between the liquefaction and the subsequent refining stages. The fraction(s) which will be treated in the subsequent refining stages are thus sent without decompression to the said stages. This configuration can be described as an integrated scheme and exhibits technical/economic advantages, given that the high pressure streams will not require an increase in pressure for the purpose of their additional refining. However, this scheme is less flexible to operate than the preceding one.

Indirect Route:

A portion at least of the carbon-based material and/or of the residual fraction from the direct liquefaction is/are subjected to a liquefaction by the indirect route. As the indirect liquefaction by gasification and then the Fischer-Tropsch synthesis is widely known, only the main operating conditions will be taken up here.

Gasification (Stage d)

The gasification stage can be carried out according to any one of the known processes, in particular steam reforming, partial oxidation and autothermal process.

Preferably, the gasification is carried out by partial oxidation (known under the abbreviation PDX), which consists in forming, by partial combustion under substoichiometric conditions, a mixture at high temperature, generally between 800° C. and 1600° C., of carbon-based material, on the one hand, and of air or oxygen, on the other hand, in order to oxidize the carbon-based material and to obtain a synthesis gas. When a nitrogen-free synthesis gas is desired, this process uses oxygen, produced by air distillation according to conventional techniques, such as, for example, an air separation unit (ASU).

The oxygen necessary for the gasification of stage d) preferably originates from the decomposition of water by electrolysis, by high-temperature electrolysis and/or by thermochemical cycles of stage c). This exhibits the advantage of eliminating the air separation unit.

The gasification produces synthesis gas and a residual fraction comprising tar oils.

The synthesis gas is generally a gas mixture comprising CO, hydrogen, water vapour and $CO_2$. In addition, it comprises sulphur-comprising, nitrogen-comprising and halogen-comprising impurities.

At least a portion of the residual fraction resulting from the gasification stage d) is preferably, in part or completely, sent to the liquefaction stage a).

Before sending the synthesis gas to the Fischer-Tropsch synthesis, the $CO_2$ present in the synthesis gas is separated and subjected, in the presence of hydrogen resulting from a non-fossil resource, to a reverse water gas reaction. It is also preferable to remove substantially all of the sulphur-comprising and nitrogen-comprising compounds from the synthesis gas obtained as they are capable of poisoning the catalysts used. This purification stage can be carried out simultaneously in the $CO_2$ separation stage.

Separation of $CO_2$ and Reverse Water Gas Reaction (Stage e)

The $CO_2$ separation stage is carried out using the synthesis gas resulting from the gasification stage d) and preferably a portion at least of the effluent from the $CO_2$ separation stage. This makes it possible to again recover a portion of the $CO_2$ not converted in stage e).

The separation of the $CO_2$ (and of the $H_2S$) is conventionally carried out by washing the gas with an aqueous solution of amines, for example of monoethanol-amine (MEA), of methyldiethanolamine (MDEA) or of dimethylethanolamine (DMEA). It is also possible, if it is desired for the synthesis gas to be extremely pure, to use, in place of the washing with amines, a purification with washing with cold methanol, for example according to the Rectisol® process, using two stages to remove COS and $H_2S$, followed by $CO_2$.

At least a portion of the $CO_2$ thus separated is subjected, in the presence of hydrogen resulting from a non-fossil resource, optionally supplemented by hydrogen resulting from a unit for the steam reforming of natural gas, and/or gases and the lightest effluents produced by the process, to a reverse water gas reaction. This reaction for the conversion of $CO_2$ to hydrogen, according to the balanced reaction $CO_2 + H_2 \rightarrow CO + H_2O$, is promoted by high temperatures.

The objective of this stage is to recover a portion at least of the $CO_2$ produced during the gasification and optionally steam reforming units, if the latter are present, and to convert into CO (and into water) at least a portion of the $CO_2$ recovered. This makes it possible to lower the $CO_2$ emissions at the same time as converting downstream, into liquid hydrocarbons, by the Fischer-Tropsch synthesis, at least a portion of the CO obtained from the recovered $CO_2$, which improves the carbon yield. This stage thus makes it possible to eliminate the water gas reaction which is normally carried out so as to increase the $H_2/CO$ ratio (but also the $CO_2$ emissions).

The water produced during the reverse water gas reaction e) is preferably recycled in the stage of production of hydrogen by electrolysis, by high-temperature electrolysis and/or by thermochemical cycles of stage c). The water streams produced during the liquefaction or other subsequent treatments are preferably recycled in the same way.

The reverse water gas reaction is carried out under similar temperature and pressure conditions to the gasification, it being possible for the pressure to be, for example, between 0.1 and 8 MPa, preferably between 1 and 4 MPa, and the temperature at the reactor outlet to be between 750 and 2000° C., preferably between 800 and 1800° C., more preferably between 850 and 1600° C. The catalyst used is, for example, a catalyst based on metal oxides. It can, for example, be a catalyst based on iron oxide or on chromium oxide but other catalysts can be envisaged. The reactor in which this stage is carried out can be operated at an HSV, for example, of between 300 and 3000 $h^{-1}$. On operating under these conditions, it is possible to adjust the $H_2/CO$ ratio to a value to close to the value desired for the Fischer-Tropsch synthesis, while limiting the contents of unconverted methane and unconverted carbon oxide.

The reverse water gas reaction can be carried out in the gasification reactor (via recycling of the $CO_2$) or in a dedicated reactor, or at least a specific reaction region. Preferably, it is carried out in a dedicated reactor which advantageously makes it possible to operate under conditions where the reaction progresses in the desired direction.

Fischer-Tropsch Synthesis

The synthesis gas having the desired $H_2/CO$ ratio and depleted in $CO_2$ and preferably other impurities is introduced into the Fischer-Tropsch section. At least a portion and preferably all of the CO produced during the reverse water gas reaction is also introduced, supplemented by at least a portion of hydrogen resulting from a non-fossil resource, in an $H_2/CO$ ratio adjusted to the Fischer-Tropsch synthesis.

In the Fischer-Tropsch process, the synthesis gas is catalytically converted into oxygen-comprising products and into essentially linear hydrocarbons in the gas, liquid or solid form. These products are generally devoid of heteroatomic impurities, such as, for example, sulphur, nitrogen or metals. They also contain virtually no or very little aromatics, naphthenes and more generally rings, in particular in the case of cobalt catalysts.

The Fischer-Tropsch conversion stage can be carried out, according to the invention, according to any one of the known processes, using any one of the known catalysts, in particular based on iron or cobalt, and it is not limited to a specific process or catalyst. Generally, the following are distinguished: the high-temperature (320-350° C.) Fischer-Tropsch process, operating with iron-based catalysts, and the "low-temperature" (between 220-240° C.) Fischer-Tropsch process, operating with catalysts based on iron or on cobalt.

Use is preferably made of a three-phase reactor in suspension in which the catalyst is in the form of fine particles comprising an inert support impregnated with iron or cobalt. Use may be made, for example, of a support made of alumina or silica, or zirconia, or silica/alumina, or alumina/zirconia, impregnated with 10% to 30% by weight of iron or cobalt, with respect to the overall catalyst. The catalyst can comprise particles with a mean diameter of between 3 and 150 µm, preferably from 10 to 120 µm, in suspension in a liquid essentially composed of reaction products, in particular paraffin waxes molten at the reaction temperature. The percentage by weight of catalyst can generally be between 10% and 40% by weight, with respect to the liquid/solid catalyst suspension. The gas surface velocity in the reactor can be between 0.05 m/s and 0.4 m/s, in particular between 0.12 and 0.3 m/s. The pressure is often between 1.5 and 4 MPa, in particular between 1.8 and 2.8 MPa. The temperature is often between 215° C. and 255° C., generally between 230° C. and 240° C. Reference may be made, in particular for further details relating to Fischer-Tropsch catalysts and/or processes, to the following patents or patent applications: EP 450 860, U.S. Pat. No. 5,961,933, U.S. Pat. No. 6,060,524, U.S. Pat. No. 6,921,778 or WO2006/067285.

The industrial processes for the Fischer-Tropsch synthesis among the most effective in maximizing the yields of middle distillates and/or heavy products typically use cobalt-based catalysts and require an $H_2/CO$ ratio in the synthesis gas of approximately 2, often of between 1.8 and 2.5 and preferably in the vicinity of 2.15. When the Fischer-Tropsch catalyst is based on iron, use may be made of $H_2/CO$ ratios of between typically 0.8 and 2 and generally between 1.2 and 1.8. A person skilled in the art, depending on the feedstock available to him, thus sees to it that a synthesis gas is obtained with an $H_2/CO$ ratio compatible with the Fischer-Tropsch catalyst used.

Subsequent Treatments

The crude products resulting from the direct route and from the indirect route generally have to be subjected to subsequent treatments in order to bring them in line with the specifications. These treatments can be generally dedicated either to the products from the direct route or to the products from the indirect route.

The crude products from the indirect liquefaction are generally subjected to a final hydroisomerization and/or hydrocracking stage in order to improve the cold properties (by increasing the percentage of branched isomers and cracking of the paraffin waxes). These processes can advantageously be carried out according to different embodiments described, for example, in Applications EP 1 406 988, EP 1 406 989, EP 1 406 990 and EP 1 421 157.

Stage f1: Hydrocracking/Hydroisomerization of the Liquid Effluent Resulting from the Indirect Liquefaction At least a portion and preferably all of the liquid effluent resulting from the Fischer-Tropsch synthesis can be sent in the presence of hydrogen into a hydroisomerization/hydrocracking region comprising a hydroisomerization/hydrocracking catalyst.

The hydrocracking/hydroisomerization stage is operated at a temperature generally of between 200 and 450° C., preferably from 250° C. to 450° C., advantageously from 300 to 450° C. and more advantageously still between 320-420° C., a pressure of between 0.2 and 15 MPa, preferably between 0.5 and 10 MPa and advantageously from 1 to 9 MPa, a space velocity of between 0.1 $h^{-1}$ and 10 $h^{-1}$, preferably between 0.2 and 7 $h^{-1}$ and advantageously between 0.5 and 5.0 $h^{-1}$, and the hydrogen content is generally between 100 and 2000 Sl/l of feedstock per hour and preferably between 150 and 1500 liters $H_2$/l of feedstock.

The hydrocracking/hydroisomerization stage of the process according to the invention is advantageously carried out under conditions such that the conversion per pass of products with a boiling point of greater than or equal to 370° C. into products having boiling points of less than 370° C. is greater than 40% by weight and more preferably still at least 50%, so as to obtain middle distillates (gas oil and kerosene) having sufficiently good cold properties (pour point, freezing point) to satisfy the specifications in force for this type of fuel.

The catalysts used in this stage are catalysts widely described in the prior art. The hydroisomerization and hydrocracking stage can be carried out, according to the invention, according to any one of the known processes, using any one of the known catalysts, and it is not limited to a specific process or catalyst. Reference may in particular be made, for further details regarding hydrocracking catalysts in the Fischer-Tropsch processes, to the patents or patent applications WO2010/112690, WO2010/015737, U.S. Pat. No. 6,733,657 or FR 2 950 896.

The majority of the catalysts currently used in hydroisomerization/hydrocracking are of the bifunctional type combining an acid function with a hydrogenating function. The acid function is generally contributed via supports of high specific surfaces (150 to 800 $m^2$/g generally) exhibiting a surface acidity, such as halogenated (in particular chlorinated or fluorinated) aluminas, phosphorated aluminas, combinations of boron and aluminium oxides, or silicas/aluminas. The hydrogenating function is generally contributed either by one or more metals from Group VIII of the Periodic Table of the Elements, such as iron, cobalt, nickel, ruthenium, rhodium, palladium, osmium, iridium and platinum, or by a combination of at least one metal from Group VI, such as chromium, molybdenum and tungsten, and at least one metal from Group VIII.

The great majority of conventional catalytic hydrocracking catalysts are composed of weakly acidic supports, such as silicas/aluminas, for example. These systems are more particularly used to produce middle distillates of very good quality. Many catalysts of the hydrocracking market are based on silica/alumina in combination with a metal from Group VIII. These systems have a very good selectivity for middle distillates and the products formed are of good quality.

According to one embodiment, the hydroisomerization/hydrocracking catalyst comprises at least one hydro-dehydrogenating element chosen from the noble metals of Group VIII, preferably platinum and/or palladium, and at least one amorphous refractory oxide support, preferably silica/alumina.

Separation after Hydrocracking (Indirect Route)

The effluents at the outlet of the hydrocracking reactor are advantageously sent via a pipe to a separation line which incorporates an atmospheric distillation and optionally a vacuum distillation and which has the aim of separating, on the one hand, the ($C_1$-$C_4$) gases, a naphtha fraction, at least one kerosene and/or gas oil fraction and then a heavy fraction.

The heavy fraction generally exhibits an initial boiling point of at least 350° C., preferably of greater than 370° C. This fraction is advantageously recycled at the top of the hydrocracking reactor of the indirect route or of the direct route.

It can also be advantageous to recycle a portion of the kerosene and/or of the diesel in the hydrocracking stage of the indirect route. It was possible to find that it is advantageous to recycle a portion of the kerosene in order to improve its cold properties.

It goes without saying that the gas oil and kerosene fractions may or may not be recovered separately; the cut points are adjusted by the operator according to his requirements.

The naphtha fraction can advantageously be treated in the same way as the naphtha fraction exiting from the direct route; it can advantageously be separated into a light naphtha fraction ($C_5$-$C_6$), which is preferably subjected to an isomerization in order to produce petrol, and a heavy naphtha fraction ($C_7$—180° C.), which is preferably subjected to a reforming in order to produce a reformate. The effluents from the isomerization and from the reforming will preferably be subsequently mixed with the corresponding fractions resulting from the direct route in order to form the petrol meeting the specifications. The hydrogen produced during the reforming is preferably recycled in the liquefaction stage and/or the hydrocracking stages. Use may also be made of the hydrogen produced in order to adjust the $H_2$/CO ratio in the Fischer-Tropsch synthesis.

In the case where the naphtha is entirely enhanced in value as petrol, the naphtha fraction resulting from the direct route is treated with that from the indirect route in the same reforming and/or isomerization units by mixing them beforehand, this configuration making it possible to reduce the capital costs. In another version, only the naphthas from the direct route are converted into petrol; the naphtha from the indirect route is enhanced in value by steam cracking.

The crude products from the direct liquefaction are preferably also subjected to a final hydrocracking stage in order to improve the cetane number, in the case of diesel, and the smoke point, in the case of kerosene (strong reduction in the content of aromatics to the advantage of the naphthenes and of the paraffins obtained by cracking the naphthenes).

Stage b1): Hydrocracking after Direct Liquefaction

The light fraction resulting from the separation stage b), comprising in particular naphtha, kerosene and diesel, optionally supplemented with a portion of the heavy fraction, is sent to a fixed bed hydrocracking reactor, after heating and mixing with additional hydrogen originating, for example, from the gasification, optionally supplemented with recycling hydrogen from the process and/or from another neighbouring refining process.

The hydrocracking stage according to the invention is operated in the presence of hydrogen and of a catalyst at a temperature of between 250° C. and 480° C., preferably between 320° C. and 450° C., very preferably between 330° C. and 435° C., under a pressure between 2 and 25 MPa, preferably between 3 and 20 MPa, at the space velocity of between 0.1 and 20 $h^{-1}$, preferably 0.1 and 6 $h^{-1}$ and preferably between 0.2 and 3 $h^{-1}$, and the amount of hydrogen introduced is such that the hydrogen to hydrocarbons ratio by volume is between 80 and 5000 $Sm^3/m^3$ and generally between 100 and 3000 $Sm^3/m^3$.

These operating conditions used in the process according to the invention make it possible to generally achieve conversions per pass of products having boiling points of greater than 150° C., preferably of greater than 200° C., of greater than 10% by weight and more preferably still of between 20 and 100% by weight.

The hydrocracking stage according to the invention can advantageously be carried out in just one or several fixed bed catalytic beds, in one or more reactors, in a "single-stage" hydrocracking scheme, with or without intermediate separation, or in a "two-stage" hydrocracking scheme, the "single-stage" or "two-stage" schemes being operated with or without liquid recycling of the unconverted fraction, optionally in combination with a conventional hydrotreating catalyst located upstream of the hydrocracking catalyst. Such processes are widely known in the prior art.

The hydrocracking process can comprise a first hydrotreating stage (also known as hydrorefining stage) in order to reduce the content of heteroatoms before the hydrocracking. Such processes are widely known in the prior art.

The hydrocracking catalysts used in the hydrocracking processes are all of the bifunctional type combining an acid function with a hydrogenating function. The acid function is contributed by supports, the specific surfaces of which generally vary from 150 to 800 $m^2/g$ and which exhibit a surface acidity, such as halogenated (in particular chlorinated or fluorinated) aluminas, the boron and aluminium oxide combinations, amorphous silicas/aluminas and zeolites. The hydrogenating function is contributed either by one or more metals from Group VIb of the Periodic Table of the Elements or by a combination of at least one metal from Group VIb of the Periodic Table and at least one metal from Group VIII.

The catalysts can be catalysts comprising metals from Group VIII, for example nickel and/or cobalt, generally in combination with at least one metal from Group VIb, for example molybdenum and/or tungsten. Use may be made, for example, of a catalyst comprising from 0.5% to 10% by weight of nickel (expressed as nickel oxide NiO) and from 1% to 40% by weight of molybdenum, preferably from 5% to 30% by weight of molybdenum, (expressed as molybdenum oxide $MoO_3$) on an acidic inorganic support. The total content of oxides of metals from Groups VIb and VIII in the catalyst is generally between 5% and 40% by weight. The ratio by weight (expressed on the basis of the metal oxides) of metal (metals) from Group VIb to metal (metals) from Group VIII is generally from approximately 20 to approximately 1 and most often from approximately 10 to approximately 2. In the case where the catalyst comprises at least one metal from Group VIb in combination with at least one non-noble metal from Group VIII, the said catalyst is preferably a sulphided catalyst.

Use is advantageously made of the following combinations of metals: NiMo, CoMo, NiW, CoW and NiMoW and more advantageously still NiMo, NiW and NiMoW, more preferably NiW.

The support will, for example, be chosen from the group formed by alumina, silica, silicas/aluminas, magnesia, clays and the mixtures of at least two of these inorganic compounds. This support can also include other compounds, for example oxides chosen from boron oxide, zirconia, titanium oxide or phosphorus pentoxide. Use is generally made of an alumina support and preferably of η- or γ-alumina.

The catalyst can also comprise a promoter element, such as phosphorus and/or boron. This element may have been introduced into the matrix or preferably have been deposited on the support. Silicon may also be deposited on the support, alone or with phosphorus and/or boron. Preferably, the catalysts comprise silicon deposited on a support, such as alumina, optionally with phosphorus and/or boron deposited on the support, also comprising at least one metal from Group VIII (Ni, Co) and at least one metal from Group VIb (Mo, W). The concentration of the said element is normally less than 20% by weight (on the oxide base) and generally less than 10%. When boron trioxide ($B_2O_3$) is present, its concentration is less than 10% by weight.

Other conventional catalysts comprise zeolite Y of FAU structural type, an amorphous refractory oxide support (generally alumina) and at least one hydro-dehydrogenating element (generally at least one element from Groups VIb and VIII and most often at least one element from Group VIb and at least one element from Group VIII).

Other catalysts are "composite" catalysts and comprise at least one hydro-dehydrogenating element chosen from the group formed by the elements from Group VIb and from Group VIII and a support based on a silica/alumina matrix and based on at least one zeolite as described in Application EP 1 711 260.

Preferably, the catalyst of the hydrocracking stage comprises at least one metal from Group VIII chosen from the group formed by Ni and Co and at least one metal from Group VIb chosen from the group Mo and W, on a support of amorphous and/or zeolitic silica/alumina type.

Prior to the injection of the feedstock, the catalysts used in the process according to the present invention are preferably subjected to a sulphurization treatment.

The effluent obtained on conclusion of the hydrocracking stage is preferably subjected to at least one separation stage in order to recover the fuel fractions. The separation stage can advantageously be carried out by methods well known to a person skilled in the art, such as distillation, including flash distillation, stripping, liquid/liquid extraction, and the like.

Preferably, the separation is carried out in a fractionation section which incorporates a high pressure high temperature (HPHT) separator, an atmospheric distillation and optionally a vacuum distillation which makes it possible to separate a gas phase, at least one light fraction of liquid hydrocarbons of naphtha, kerosene and/or diesel type and optionally a heavy residual fraction comprising vacuum gas oil.

At least a portion of the naphtha fraction obtained can advantageously be separated into a light naphtha ($C_5$-$C_6$) fraction, which is preferably subjected to an isomerization process in order to produce petrol, and a heavy naphtha ($C_7$—180° C.) fraction, which is preferably a feedstock for a catalytic reforming process in order to produce reformate. The reforming and isomerization processes are widely known in the prior art; the objective of the catalytic reforming is to convert the naphthene constituents into aromatic constituents having a high octane number acting as base for the mixture of the petrols; isomerization makes it possible to convert a linear paraffin into an isomerized paraffin with the aim of increasing its octane number. The effluents from the isomerization and from the reforming can be combined. They will subsequently be mixed with the corresponding fractions resulting from the indirect route in order to form the petrol meeting the specifications. Preferably, the naphtha fraction obtained after the stage of separation of the hydrocracked effluent resulting from the direct liquefaction (stage b1)) and/or the naphtha fraction obtained after the stage of separation of the hydrocracked/hydroisomerized effluent resulting from the indirect liquefaction (stage f1)) are separated, alone or as a mixture, into a light naphtha fraction and a heavy naphtha fraction; all or part of the said light naphtha fraction is subjected to an isomerization; all or part of the said heavy naphtha fraction is subjected to a catalytic reforming.

The hydrogen produced during the reforming is preferably recycled in the direct liquefaction stage and/or the hydrocracking stages.

The kerosene and gas oil fractions can be partially distilled, jointly or separately. They can also not be separated if it is desired to produce a broad gas oil fraction. If need be, in particular after a hydrocracking carried out at moderate pressure, these fractions can also be subjected to a hydrotreating or a hydrocracking under high hydrogen pressure. They will subsequently be mixed with the corresponding fractions resulting from the indirect route in order to form, for example, middle distillates meeting the specifications.

Final Mixing

For example, in order to form middle distillates, at least a portion and preferably all of the kerosene fraction resulting from the direct route is mixed with at least a portion and preferably all of the kerosene fraction resulting from the indirect route. Likewise, at least a portion and preferably all of the diesel fraction resulting from the direct route is mixed with at least a portion and preferably all of the diesel fraction resulting from the indirect route.

In the case of post-treatments of the naphtha fraction (reforming and/or isomerization), at least a portion and preferably all of the petrol fraction or fractions resulting from the direct route is mixed with at least a portion and preferably all of the petrol fraction or fractions resulting from the indirect route.

The fuel bases thus produced comprise, by virtue of the differences in conversion routes, different proportions of direct and indirect liquids, which are not a priori determined by an a posteriori mixing but by an amount of hydrocarbon feedstock introduced into each route. The fuel bases generally meet the commercial specifications. Preferably, all of the corresponding fractions obtained by each route are mixed. This limits the losses in yields.

If need be, if the specifications are not observed by a mixture of all of each fraction obtained by the two routes, a posteriori adjustment mixtures can be produced by varying the proportions of the direct and indirect liquids and/or the operating conditions of the liquefaction and/or hydrocracking stages and/or the initial and/or end boiling points.

According to a preferred embodiment, the products resulting from the two routes are mixed and subsequently subjected together to subsequent treatments, which makes it possible to lower the capital costs and the operating costs, for example a common hydrocracking.

According to an alternative form of the process, at least a portion of the "light" fraction of hydrocarbons obtained on conclusion of stage b) and at least a portion of the effluent from the Fischer-Tropsch synthesis of stage f) are sent to a common hydrocracking stage, which makes it possible to lower the capital costs and the operating costs.

At least a portion of the effluent from the separation after direct liquefaction (stage b) and at least a portion and preferably all of the liquid effluent resulting from the Fischer-Tropsch synthesis (stage f) are sent to a common hydrocracking unit. The separation after hydrocracking and the optional post-treatment of the naphtha fraction are identical to the corresponding stages described in the direct route section.

Although the hydrocracking stage of the direct route is generally carried out under more severe conditions than that of the indirect route, the appropriate choice of the catalyst(s), of the reactor(s) and of the operating conditions makes it possible to treat the two fundamentally different effluents in a common stage.

The catalyst of the common hydrocracking stage can be a catalyst described for the direct-route hydrocracking stage. Preferably, the catalyst comprises at least one metal from Group VIII chosen from the group formed by Ni and Co and at least one metal from Group VIb chosen from the group Mo and W, on a support of amorphous and/or zeolitic silica/alumina type. It is preferably subjected to a sulphurization treatment.

The common hydrocracking stage is carried out at a temperature of between 250° C. and 480° C., preferably between 320° C. and 450° C., very preferably between 330° C. and 435° C., under a pressure between 2 and 25 MPa, preferably between 3 and 20 MPa, at the space velocity of between 0.1 and 20 h$^{-1}$, preferably between 0.1 and 6 h$^{-1}$, preferably between 0.2 and 3 h$^{-1}$, and the amount of hydrogen introduced is such that the ratio by volume of hydrogen to hydrocarbons is between 80 and 5000 Sm$^3$/m$^3$ and generally between 100 and 3000 Sm$^3$/m$^3$.

BRIEF DESCRIPTION OF THE DRAWINGS

FIG. 1 diagrammatically illustrates the process of the invention. The plant and the process according to the invention are essentially described. The operating conditions described above will not be taken up.

Figure 1:
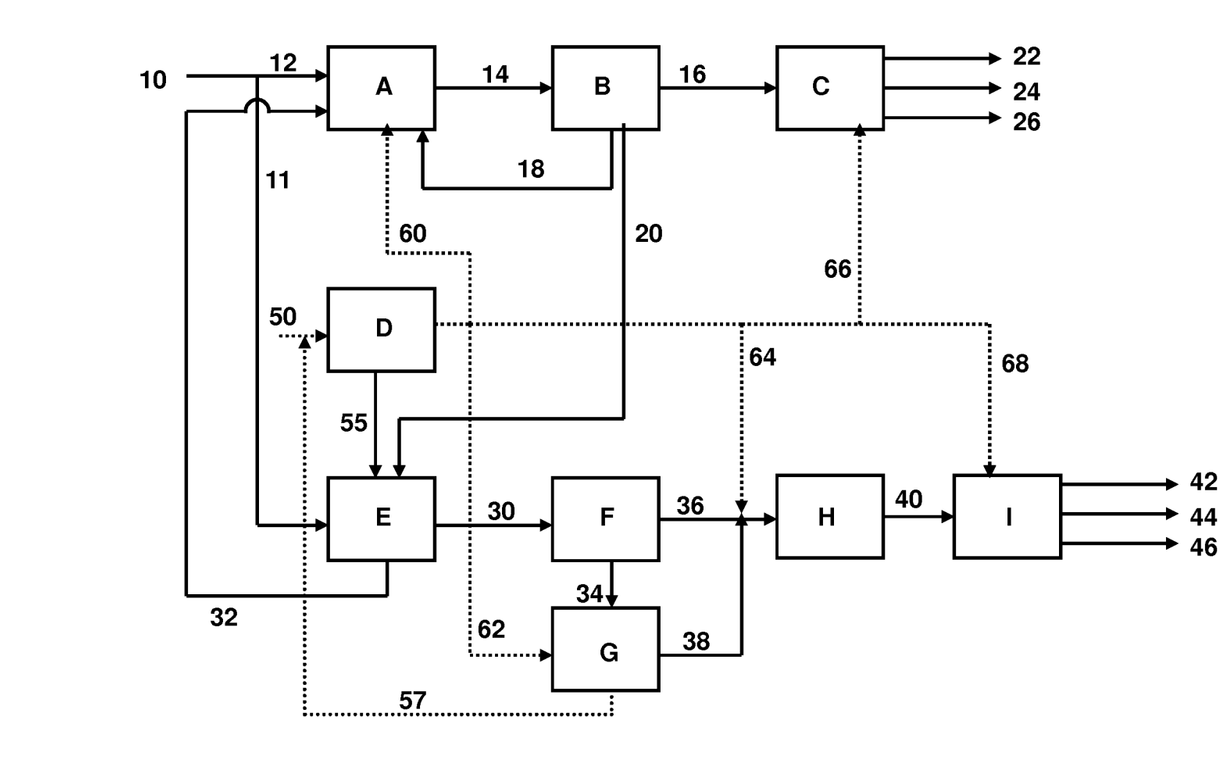

In FIG. 1, a portion of the carbon-based material (10) is introduced via the line 12 into the direct liquefaction unit (A), which diagrammatically represents two ebullated-bed liquefaction reactors.

The hydrogen (60) necessary for the liquefaction originates from a non-fossil resource, for example from the decomposition of water (50), and is produced, for example, by an electrolyser (D) which also produces oxygen (55). The electrolyser (D) also produces the hydrogen supplying the unit of the reverse water gas reaction (G) via the line (62), the Fischer-Tropsch unit (H) via the line (64), in order to adjust the necessary H$_2$/CO ratio, and optionally the subsequent treatment units via the lines (66) and (68).

The effluent from the liquefaction (14) is subjected to at least one separation stage (B) in order to separate at least one light fraction (16), comprising the gases, naphtha and light gas oil, indeed even heavy gas oil, a vacuum distillate fraction (18), comprising vacuum gas oil, and a vacuum residue fraction (20). A portion or all of the vacuum distillate fraction (18) is recycled as solvent in the liquefaction unit (A). A portion or all of the vacuum residue fraction (20) can be recycled in the gasification unit (E) as feedstock. The light fraction(s) (16) obtained after the separation can be subjected to at least one refining stage (C), the objective being to bring the different fractions in line with the specifications. A gas fraction (22), at least one liquid fraction (naphtha, kerosene and/or diesel) (24) and optionally a heavy fraction (26) are thus obtained.

According to a first embodiment, the gasification unit (E) can be supplied with another portion (11) of the carbon-based material in order to produce the synthesis gas.

According to a second embodiment, the gasification unit (E) can be supplied with at least a portion of the vacuum residue fraction (20) resulting from the separation after the direct liquefaction.

According to a third embodiment, the gasification unit (E) can be supplied with a mixture of carbon-based material (11) and at least a portion of the vacuum residue fraction (20). The oxygen (55) necessary for the gasification preferably originates from the electrolysis (D).

The gasification unit (E) produces the synthesis gas (30) and a residual fraction (32). This residual fraction (32) can be sent as feedstock to the direct liquefaction unit (A). The synthesis gas (30) is sent to a unit for separation of the $CO_2$ (F), in which other impurities ($H_2S$, and the like) are also removed. The separated $CO_2$ (34) is sent to a reverse water gas reaction unit (G) in which it is converted into water and CO in the presence of hydrogen originating from the electrolysis (62). The water (57) can be recycled in the electrolysis (D). The Fischer-Tropsch unit (H) is supplied with the purified synthesis gas (36), as well as with the CO produced (38) from the reverse water gas reaction unit (F) and hydrogen (64) resulting from the electrolysis in an appropriate $H_2/CO$ ratio.

The effluent from the Fischer-Tropsch synthesis (40) can subsequently be sent to at least one refining stage (I), the objective being to bring the various fractions in line with the specifications. The refining stage is generally a hydroisomerization and/or hydrocracking stage, in order to improve the cold properties. A final separation makes it possible to obtain a gas fraction (42), at least one liquid fraction (naphtha, kerosene and/or diesel (44) and a heavy fraction (46).

EXAMPLES

The following examples illustrate the invention described without, however, limiting the scope thereof. Example 1 (not in accordance with the invention) relates to the direct liquefaction of coal in two stages according to the conventional route using hydrogen produced by coal gasification. Example 2 (not in accordance with the invention) relates to the direct liquefaction of coal in two stages using hydrogen produced by a non-fossil resource. Examples 3 and 4 (according to the invention) relate to the liquefaction by the hybrid route using hydrogen produced by a non-fossil resource.

Example 1

Not in Accordance with the Invention

Coal of Illinois No. 6 type was used. The coal is subjected to a two-stage direct ebullated bed liquefaction, according to the H-Coal TS® process. The operating conditions of the liquefaction appear in Table 1. The hydrogen necessary for the liquefaction originates from a coal gasification. The performance of the overall coal liquefaction line is described in Table 2.

TABLE 1

| Operating conditions of the two-stage liquefaction | |
|---|---|
| Catalyst | NiMo/Alumina |
| Reactor R1 temperature (° C.) | 410 |
| Reactor R2 temperature (° C.) | 440 |

TABLE 1-continued

| Operating conditions of the two-stage liquefaction | |
|---|---|
| Catalyst | NiMo/Alumina |
| Pressure, MPa | 17 |
| HSV R1 (kg/h dry coal/kg catalyst) | 1.2 |
| HSV R2 (kg/h dry coal/kg catalyst) | 1.2 |
| $H_2$ inlet ($Sm^3$/kg dry coal) | 2.8 |
| Liquid recycle/coal | 1.1 |

According to Table 2, the H-Coal TS® direct liquefaction process produces 3.9 barrels of liquid hydrocarbons (liquefied petroleum gas (LPG)+Naphtha+Diesel) per tonne of ash-free dry coal. This value incorporates the production of hydrogen. For 100 tonnes of coal, 68 tonnes are dedicated to liquefaction and 32 tonnes to the production of hydrogen. Furthermore, the final products are considered to meet the required specifications. 57.5% of the carbon present in the coal is incorporated in the SNG+LPG+Naphtha+Diesel products.

The amount of $CO_2$ emitted per kg of liquid bases is calculated from the following expression:

$$\text{kg } CO_2 \text{ emitted/kg liquid bases} = \frac{CO_2 \text{ generated (kg/h)}}{SNG + LPG + naphtha + \text{diesel (kg/h)}}$$

in which SNG means "synthetic natural gas" and LPG means "liquefied petroleum gas". Furthermore, it is considered that 80% of the $CO_2$ emissions originate from the coal gasification for the production of the hydrogen. In order to estimate the amount of $CO_2$ produced, it is assumed that all the carbon injected at the inlet of the unit and which is not incorporated in the products of enhanced economic value (SNG, LPG, naphtha, diesel) will be reencountered at the outlet of the unit in the form of $CO_2$. The production of one kilogram of "SNG+LPG+Naphtha+Diesel" products emits 2.5 kg of $CO_2$.

Example 2

Not in Accordance with the Invention

The direct liquefaction of Example 1 was repeated under the same operating conditions (Table 1). The hydrogen originates from the electrolysis of water using electricity resulting from a nuclear power station. The 340° C.$^+$ fraction, obtained after the separation of the effluent from the liquefaction and representing approximately 12% by weight of the coal liquefaction products (organic fraction+undissolved coal), is not made economic use of as fuel in this example. It is subjected to combustion (or oxy-combustion using the $O_2$ produced by the electrolysis), then producing heat and $CO_2$.

The performance of the liquefaction using hydrogen resulting from a non-fossil resource is summarized in Table 2. This process produces 5.65 barrels of liquid hydrocarbons (LPG+Naphtha+Diesel) per tonne of ash-free dry coal. 82.2% of the carbon present in the coal is incorporated in the SNG+LPG+Naphtha+Diesel products. The production of one kilogram of "SNG+LPG+Naphtha+Diesel" products emits 0.7 kg of $CO_2$.

Example 3

In Accordance with the Invention

The process for the conversion of coal to fuel bases according to the invention is carried out (hybrid route): 50% by weight of the coal are sent to direct liquefaction, which is carried out under the same operating conditions as Example 1 (Table 1), and 50% by weight are sent to a gasification for conversion by the indirect route. The hydrogen originates from the electrolysis of water using electricity resulting from a nuclear power station.

The $CO_2$ emitted during the gasification is separated and subjected to a reverse water gas reaction in order to produce CO made economic use of in the Fischer-Tropsch synthesis.

The syngas is sent to the Fischer-Tropsch reactor; the $H_2$/CO ratio upstream of the reactor is adjusted via a hydrogen back-up resulting from non-fossil resources. The catalyst used in the Fischer-Tropsch synthesis is based on iron.

The performance of the process according to the invention is summarized in Table 2.

Example 4

In Accordance with the Invention

Example 3 is repeated but 100% of the coal is sent to direct liquefaction and the gasification is supplied solely with the 340° C.+ fraction which is obtained after the separation of the effluent from the liquefaction and which represents approximately 12% by weight of the coal liquefaction products (organic fraction+undissolved coal). The performance of the process according to the invention is summarized in Table 2.

In comparison with the conventional scheme (Example 1) and with the DCL+non-fossil $H_2$ scheme (Example 2), the conversion of coal to liquid products in Examples 3 and 4 according to the invention is greatly increased. 93.3/93.2% of the carbon present in the coal is incorporated in the SNG-LPG-naphtha-diesel products, versus 57.5% by the conventional DCL route or 82.2% by the direct route+non-fossil $H_2$. This thus results in a significant reduction in the $CO_2$ emissions: the production of one kilogram of "SNG+LPG+Naphtha+Diesel" products emits 0.23/0.22 kg of $CO_2$, versus 2.5 kg by the conventional route and 0.7 kg by the direct route+non-fossil $H_2$. It should be noted that, for the indirect route, this value is estimated at 4.3 kg.

As regards the quality of the fuel bases produced (density at 15° C. and cetane number), it is observed that the fuel bases produced according to the invention are close to or within the specifications in force.

TABLE 2

Performances of the coal liquefaction for the production of fuels - Direct or hybrid route - Contribution of fossil and non-fossil hydrogen

|  | Ex. 1 not in accordance | Ex. 2 not in accordance | Ex. 3 in accordance | Ex. 4 in accordance |
|---|---|---|---|---|
| Route | DCL + fossil $H_2$ gasification | DCL + non-fossil $H_2$ electrolysis | Hybrid + non-fossil $H_2$ electrolysis | Hybrid + non-fossil $H_2$ electrolysis |
| Hydrogen source | | | | |
| Coal feedstock for liquefaction and gasification* (t/h) | 100 | 100 | 100 | 100 |
| Yield (t/h): $C_1 + C_2$* (synthetic natural gas or "SNG") | 3.8 | 4.5 | 2.4 | 4.5 |
| $C_3 + C_4$ (LPG) | 3.4 | 10.5 | 9.9 | 11.4 |
| Naphtha ($C_5$-180° C.) | 11.6 | 18.0 | 25.5 | 21.5 |
| density 15° C. (kg/m³) | 823 | 823 | 730 | 796 |
| Diesel (180-388° C.) | 30.7 | 38.0 | 42.6 | 43.0 |
| density 15° C. (kg/m³) | 871 | 871 | 815 | 858 |
| Cetane number | 51 | 51 | 60 | 51 |
| $C_3$-340° C. | 45.7 | 56.5 | 78.0 | 75.9 |
| Coal conversion (bbl/t ash-free dry coal) | 3.90 | 5.65 | 6.22 | 5.8 |
| Yield of liquid bases (% of carbon present in the coal incorporated in the SNG + LPG + Naphtha + Diesel products) | 57.5 | 82.2 | 93.3 | 93.2 |
| kg $CO_2$/kg liquid bases | 2.5 | 0.7 | 0.23 | 0.22 |

*gasification solely for Examples 1 and 3

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Nos. 11/03.754 and 11/03.755, both filed Dec. 7, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for the conversion of carbon-based material to fuel bases, comprising the following stages:
   a) liquefaction of at least a portion of the said carbon-based material in the presence of hydrogen in at least one reactor comprising a supported catalyst as an ebullated bed,
   b) separation of the effluent obtained on conclusion of stage a) into at least one light fraction of fuel base hydrocarbons and a residual fraction comprising compounds boiling at at least 340° C.,
   c) production of hydrogen using at least one non-fossil resource, the hydrogen thus produced being at least in part introduced into the liquefaction stage a), and the subsequent reverse water gas reaction stage e) and subsequent Fischer-Tropsch reaction stage f),
   d) gasification of a portion of the carbon-based material and/or of a portion at least of the residual fraction resulting from stage b) in order to produce synthesis gas comprising hydrogen, CO and $CO_2$, and a residual fraction from the gasification,
   e) separation of a portion at least of the $CO_2$ present in the synthesis gas and conversion of the separated $CO_2$ by a reverse water gas reaction in the presence of hydrogen resulting from stage c), to produce CO and water, f) conversion of the synthesis gas, supplemented with at least a portion of the CO resulting from stage e) and at least a portion of hydrogen resulting from stage c), by Fischer-Tropsch synthesis to give fuel bases.

2. Process according to claim 1, in which the said non-fossil resource is water, hydrochloric acid, hydrogen chloride, hydrogen sulphide and/or biomass.

3. Process according to claim 2, in which the production of hydrogen comprises the decomposition of water by electrolysis, by high-temperature electrolysis, by thermochemical cycles and/or by microorganisms.

4. Process according to claim 2, in which the production of hydrogen comprises the electrolysis of hydrochloric acid and/or the reaction of hydrogen chloride with cerium dioxide.

5. Process according to claim 2, in which the production of hydrogen comprises the decomposition of hydrogen sulphide by thermal treatment and/or by reaction with metal oxides.

6. Process according to claim 2, in which the production of hydrogen comprises biomass gasification.

7. Process according to claim 1, in which the energy supplying the production of hydrogen is a non-fossil energy chosen from the group formed by nuclear energy, photovoltaic solar energy, low-temperature solar thermal energy, high-temperature solar thermal energy, wind energy, water power or hydroelectricity, marine energy sources, geothermal energy and/or biomass, alone or as a combination of two or more of them in equal or different proportions.

8. Process according to claim 1, in which the said carbon-based material is a feedstock chosen from the group formed by coal, biomass, algae, feedstocks resulting from oil and/or from the refining of oil, products resulting from the thermochemical or hydrothermal conversion of these feedstocks, hydrocarbon waste, industrial polymers, organic waste and/or household plastics, alone or as a mixture of two or more of them in equal or different proportions.

9. Process according to claim 1, in which the separation stage b) makes it possible to obtain a gas phase, at least one light fraction of hydrocarbons of naphtha, kerosene and/or diesel type and at least one residual fraction comprising compounds boiling at at least 340° C. comprising a vacuum distillate fraction and a vacuum residue fraction.

10. Process according to claim 9, in which at least a portion of the vacuum distillate fraction is recycled, in part or completely, in the liquefaction stage a).

11. Process according to claim 9, in which at least a portion of the vacuum residue fraction is sent to the gasification stage d).

12. Process according to claim 1, in which at least a portion of the residual fraction resulting from the gasification stage d) is, in part or completely, sent to the liquefaction stage a).

13. Process according to claim 1, in which a portion of the hydrogen present in the synthesis gas from stage d) is separated and sent to the liquefaction stage a).

14. Process according to claim 3, in which the oxygen necessary for the gasification of stage d) originates from the decomposition of water by electrolysis, by high-temperature electrolysis and/or by thermochemical cycles of stage c).

15. Process according to claim 3, in which the water produced during the reverse water gas reaction e) is recycled in the stage of production of hydrogen by electrolysis, by high-temperature hydrolysis and/or by thermochemical cycles of stage c).

16. Process according to claim 1, comprising at least one of the following refining stages:
  b1) hydrocracking in the presence of hydrogen of at least a portion of the "light" fraction of hydrocarbons obtained on conclusion of stage b) in at least one reactor comprising a fixed bed hydrocracking catalyst, and separation of the effluent obtained on conclusion of the hydrocracking into at least one liquid fraction comprising naphtha, kerosene and/or diesel and, optionally, a heavy fraction comprising vacuum gas oil,
  f1) hydrocracking/hydroisomerization in the presence of hydrogen of at least a portion of the effluent from the Fischer-Tropsch synthesis in at least one reactor comprising a hydrocracking and/or hydroisomerization catalyst,
  and separation of the effluent obtained on conclusion of the hydrocracking/hydroisomerization into at least one liquid fraction comprising naphtha, kerosene and/or diesel and, optionally, a heavy fraction,
  c) final mixing of the liquid fractions comprising naphtha, kerosene and/or diesel resulting from stages b1) and f1).

17. Process according to claim 1, in which at least a portion of the "light" fraction of hydrocarbons obtained on conclusion of stage b) and at least a portion of the effluent from the Fischer-Tropsch synthesis of stage f) are sent to a common hydrocracking stage.

18. Process according to claim 17, in which the catalyst of the common hydrocracking stage comprises at least one metal from Group VIII chosen from the group formed by Ni and Co and at least one metal from Group VIb chosen from the group Mo and W, on a support of amorphous and/or zeolitic silica/alumina type.

19. Process according to claim 17, in which the common hydrocracking stage is carried out at a temperature of between 250° C. and 480° C., under a pressure between 2 and 25 MPa, at the space velocity of between 0.1 and 20 $h^{-1}$, and the amount of hydrogen introduced is such that the ratio by volume of hydrogen to hydrocarbons is between 80 and 5000 $Sm^3/m^3$.

* * * * *